Sept. 20, 1932.     M. H. ACKERMAN     1,877,780
AUTOMATIC REGULATOR
Filed Aug. 28, 1929     3 Sheets-Sheet 1
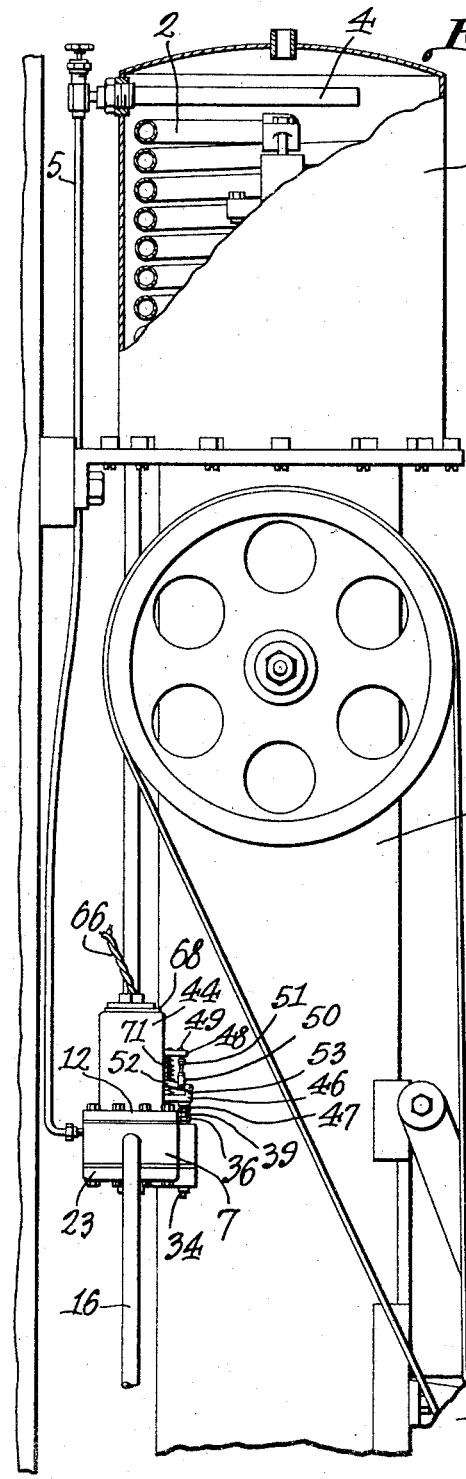
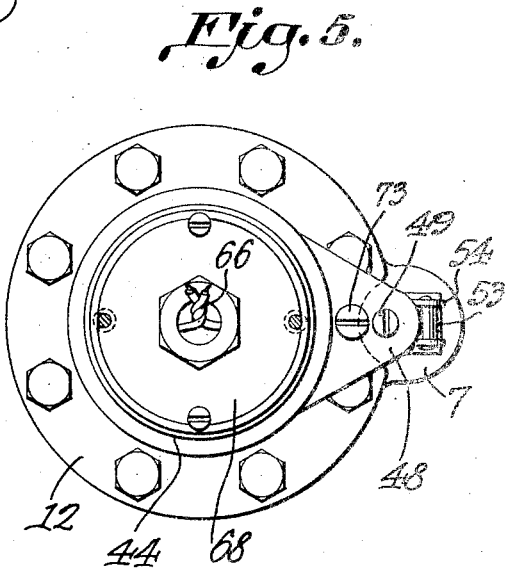
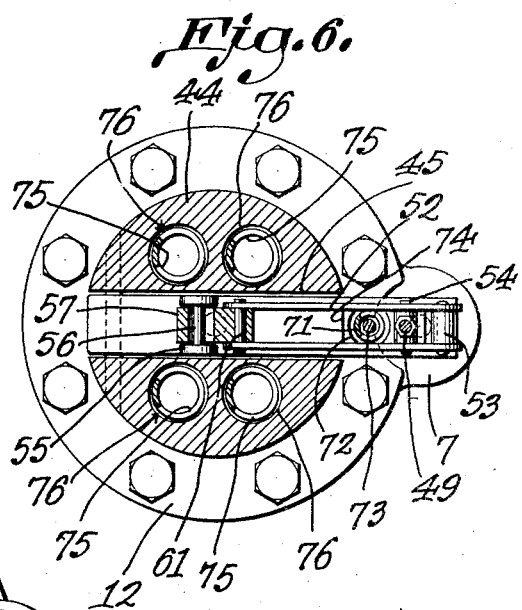
Michael H. Ackerman, Inventor
By C.A.Snow & Co.
Attorneys

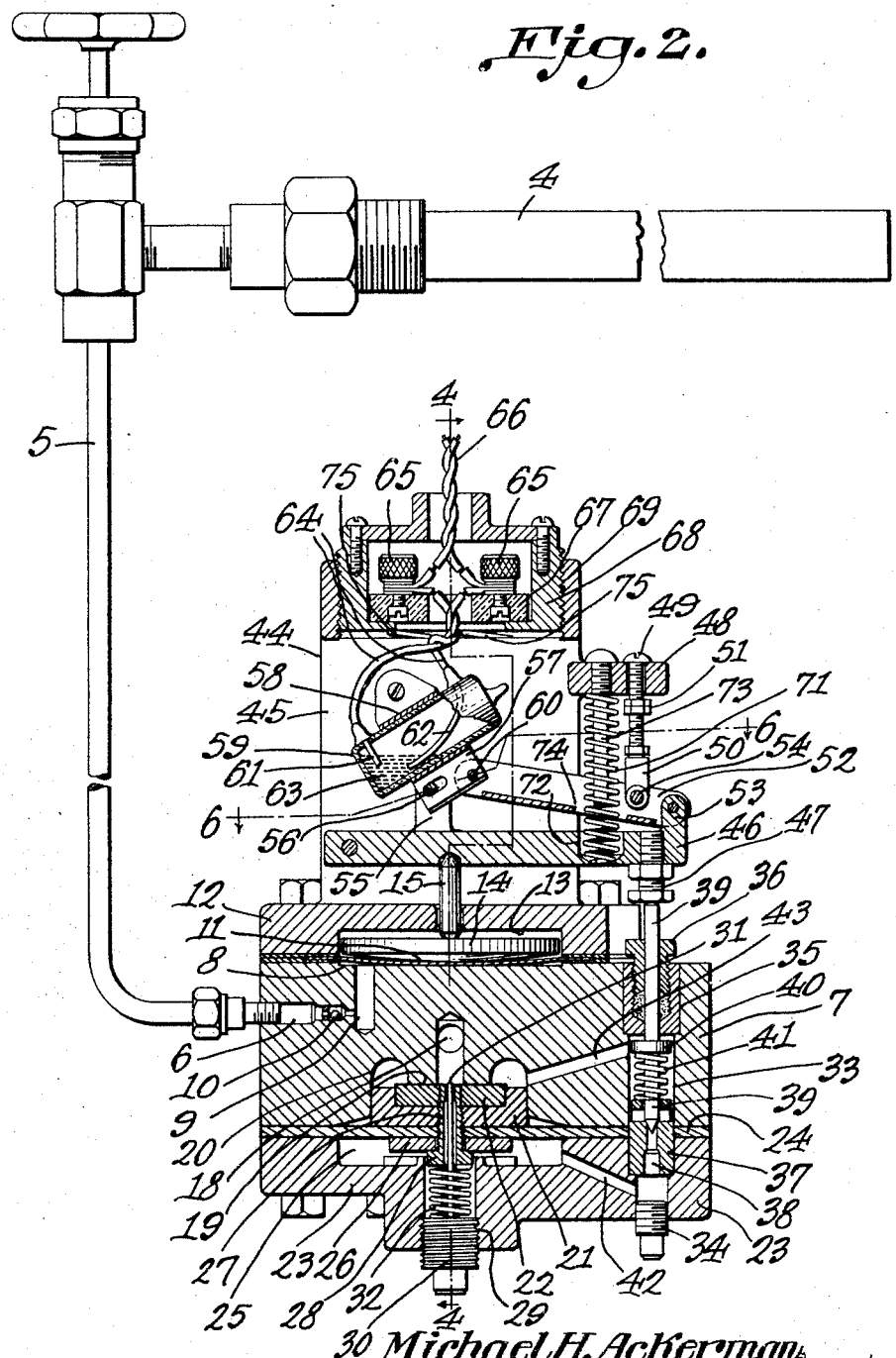

Sept. 20, 1932.  M. H. ACKERMAN  1,877,780
AUTOMATIC REGULATOR
Filed Aug. 28, 1929   3 Sheets-Sheet 3
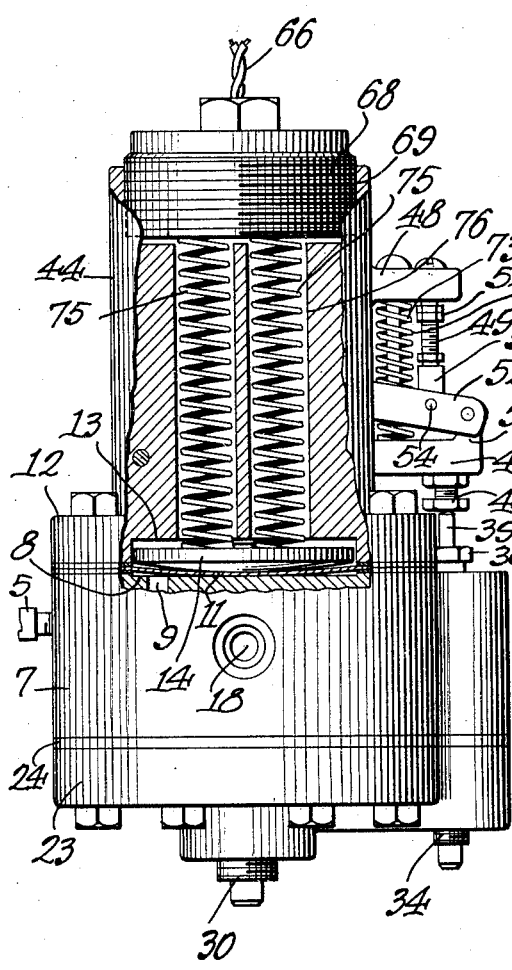
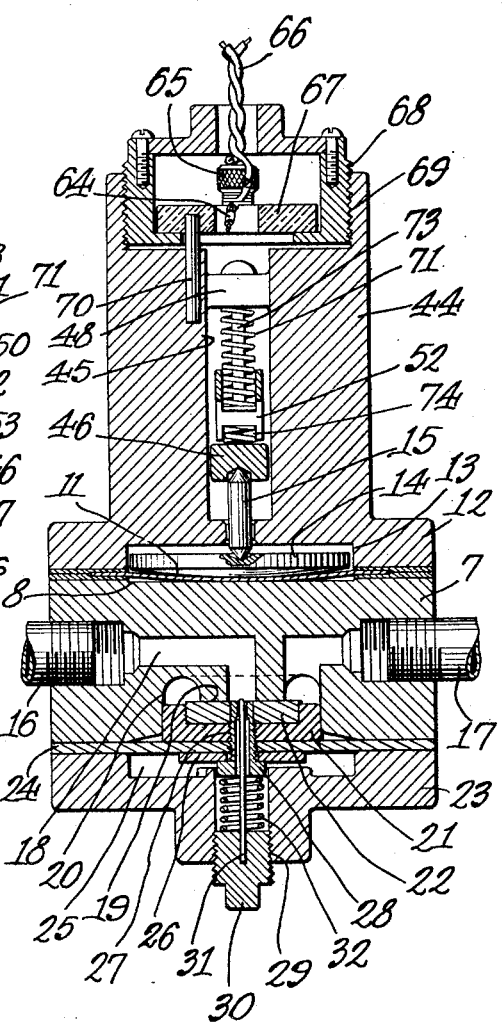
Michael H. Ackerman, Inventor
By C. A. Snow & Co.
Attorneys.

Patented Sept. 20, 1932

1,877,780

UNITED STATES PATENT OFFICE

MICHAEL HENRY ACKERMAN, OF MANSFIELD, OHIO, ASSIGNOR OF ONE-HALF TO LOUIS C. SICKEL OF CALEDONIA, OHIO

AUTOMATIC REGULATOR

Application filed August 28, 1929. Serial No. 389,018.

This invention relates to an automatic regulator of that type including a pressure controlled valve, one of the objects being to provide a simple and efficient regulator for use in the art of mechanical refrigeration and also for heat regulation and the control of fuel burners.

Valves used for this purpose have heretofore incorporated the principle of controlling the entire volume of water, gas or oil directly by the action of a spring loaded steel diaphragm which could be adjusted to function at approximately the desired pressure and actuate the water or fuel valve.

Such valves have been objectionable, however, because the diaphragms have necessarily been made of relatively thick metal sheets and have had a limited movement, which has correspondingly limited the movement and volumes passing through the water or fuel valve. Such valves have also been objectionable, due to the heavy spring resistance associated therewith, a considerable force being required to compress the spring resistance even slightly to meet increased demands for water or fuel delivery.

The wide range of pressure necessary to completely open or close valves constructed for direct control of volume by pressure actuated diaphragms is considerable. As an example it might be stated that pressure controlled water valves such as used on refrigerating machinery require a considerable rise in pressure before the flow of water starts and they remain open until a considerable fall occurs in the condensing pressure.

This wide pressure range tends to waste water and the slow pressure change frequently permits the water valve to become hung at a neutral point, allowing water to flow unrestrained over long periods and eventually cutting out the valve seat.

It is the object of the present invention to provide an automatic pressure or thermal control of the electric circuit and water supply which eliminates the objectionable features enumerated.

Other objects of the invention are to reduce the amount of water or fuel controlled by the pressure or thermal controlled spring loaded diaphragm to a minimum, and so construct the device that this minimum flow will actuate the main supply valve and afford close pressure regulation.

Another object is to provide a pressure control of an electric circuit that will function automatically at predetermined pressures; for example, to stop the motor on a refrigerating plant compressor at high pressure and to start the motor again when pressures return to normal.

A further object is to provide a pressure control of the electrical circuit that will be positive in action and have all the circuit control elements move away from the water valve to break the electrical circuit so that in the event the water valve becomes frozen or obstructed, the electric circuit breaker will function as a high pressure motor stop.

With the foregoing and other objects in view which will appear as the description proceeds the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

In said drawings,

Figure 1 is an elevation of a portion of a refrigerating apparatus of the type shown, for example, in my co-pending application filed May 2, 1928, Serial Number 274,588, the present improvements being shown combined therewith.

Figure 2 is an enlarged section through the valve and the parts associated therewith.

Figure 3 is a side elevation of the structure, a portion being broken away.

Figure 4 is a section on line 4—4, Figure 2.

Figure 5 is a plan view of the structure shown in Figures 3 and 4.

Figure 6 is a section on line 6—6, Figure 2.

Referring to the figures by characters of reference, 1 designates the casing of a refrigerating unit having a condensing coil 2 contained within a jacket 3 for holding water. In the present structure there is arranged in this jacket a tube 4 for holding ammonia or other expansible substance, this tube being connected by a valved pipe 5 to a pressure inlet port 6 formed in the intermediate member 7 of the casing of the valve structure.

A recess 8 is formed in the upper face of the member 7 and communicates through a pocket 9 with the inlet port 6 there being a check valve 10 in said port for automatically cutting off communication between the port and the recess or pocket 9 should there be a rupture of the diaphragm.

A relatively thin diaphragm 11 extends over the recess 8 and is clamped on the member 7 by a top member 12. A recess 13 is formed in the member 12 and contains a disk 14 that rests on the diaphragm and supports a pin 15 slidable within and extending above the member 12.

Opening into the intermediate member 7 is a water supply pipe 16 while a water outlet pipe 17 is extended from said member 7 at a point preferably diametrically opposite pipe 16. Pipe 16 communicates with a passage 18 that opens downwardly through a valve seat 19 formed in a bore 20 in the bottom of member 7. This seat is surrounded by the inner portion of the bore and is spaced upwardly from the bottom of the member 7.

A piston 21 is slidably mounted in the bore 20 and carries a washer 22 that is seated therein and adapted to close against seat 19.

A bottom member 23 is bolted to the intermediate member 7 and serves to clamp the marginal portion of a diaphragm 24 against the member 7. This diaphragm supports the piston 21 and extends over a recess 25 formed in the top of the member 23.

A washer 26 engages the bottom of diaphragm 24 at the center thereof and is held assembled with the diaphragm by a tubular bolt 27 that is extended through disk 26, diaphragm 24, piston 21, and washer 22, this bolt being threaded into these parts so as to draw them together tightly. The head 28 of the bolt is arranged beneath disk 26. This bolt serves not only to hold the several parts assembled but also provides a port through which fluid may flow from the passage 18 into the recess 25.

An opening 29 is formed in the bottom of the member 23 for the reception of screw plug 30 and extending from this screw plug is a pin 31 that projects longitudinally within the tubular bolt 27 and is spaced from the wall thereof. This pin, which is stationary except when the plug 30 is adjusted, serves as a means for keeping clean the passage through the bolt 27 as the diaphragm shifts relative to the pin.

A spring 32 is mounted under screw plug 30 and thrusts against the head 28. This spring acts as a means for resisting the downward movement of the diaphragm 24 and the parts carried thereby and serves to build up a pressure in the recess or chamber 25 as hereinafter explained.

Extending through the members 7 and 23 is a bore 33 closed at one end by a screw plug 34 or the like and at its other end by a plug 35 containing a packing gland 36. A plug 37 is seated in the bore at a point between the ends thereof and has a passage 38 therethrough. This plug constitutes the seat of a needle valve 39 slidably mounted in one end portion of the plug and operating to shut off the flow of fluid through the passage 38 from one end to the other of the bore 33. A collar 40 is carried by the needle valve and is engaged by one end of a coiled spring 41, the other end of this spring thrusting against the reduced end of plug 37. Thus valve 39 is normally held off of its seat by the spring.

A passage 42 connects the recess or chamber 25 to the bore 33 at a point below the seat plug 37 while another passage 43 connects the bore or chamber 20 with bore 33 at a point above the seat plug 37.

A bonnet 44 is secured to or formed on the member 12 and has a central diametrical slot 45 in which is fulcrumed a lever 46 that engages and is adapted to bear upon the upper end of pin 15. A stud 47 can be adjustably connected to the free end of this lever and is adapted to bear upon valve 39.

An ear 48 extends across the upper portion of slot 45 and slidably mounted in this ear is a bolt 49 to the lower end of which is connected a yoke 50. A nut 51 is adjustably mounted on the bolt and cooperates with the head of the bolt to limit the sliding movement of said bolt relative to the ear 48. An intermediate lever 52 is fulcrumed at one end upon an upstanding ear 53 on the free end of lever 46 and close to its fulcrum this intermediate lever 52 is connected to yoke 50 as shown at 54.

A forked ear 55 is extended upwardly from lever 46 at a point adjacent to the fulcrum thereof and a pin 56 is carried by this ear. On this pin 56 is pivotally and slidably mounted a wing 57 extending downwardly from a clamp 58 in which is held the draft tube 59 of a mercury switch. This wing is pivotally attached at 60 to the intermediate lever 52. In the tube 59 are arranged spaced contacts 61 and 62 adapted, when the tube is at one angle, to be electrically connected by mercury indicated at 63. When the tube 59 is tilted to its other extreme position, the mercury will act to break the electrical connection.

The two contacts 61 and 62 have wires 64 leading therefrom to terminals 65 from which a cord 66 is extended. These terminals are mounted on a disk 67 seated in a screw plug 68 that is screwed into an opening 69 in the top of the bonnet 44. The disk 67, which is of insulating material, can be held against rotation, after the screw plug 68 has been screwed into position, by means of a dowel 70 seated in the bonnet and extending into a recess in the disk. See Figure 4.

A coiled spring 71 is interposed between the ear 48 and lever 46, one end of this spring being seated in a recess 72 in lever 46 while the other end is mounted on a guide pin 73 extending downwardly from the ear 48. This spring extends loosely through an opening 74 in the intermediate lever 52.

Coiled springs 75 are seated in bores 76 in the bonnet 44 and bear at their upper ends against the screw plug 68 while their lower ends extend into the recess 13 and bear upon the disk 14. Preferably four of these springs are used, the same engaging the disk 14 at opposite sides of the slot 45 as clearly indicated in Figure 6.

Under normal conditions the absorption of heat by the contents of the tube 4 and pipe 5 will result in the expansion of said contents so that pressure will thus be directed against the bottom of diaphragm 11. This pressure will be sufficient to elevate disk 14 against the action of springs 75 so that pin 15 will thrust against lever 46 and cause the ear 53 to push upwardly against the small arm of the intermediate lever 52, this action being against that of the spring 71. Thus intermediate lever 52 will swing downwardly at its point of connection 60 with wing 57 with the result that the mercury switch will be tilted from the position shown in Figure 2 to its other extreme position and an electrical connection between the contacts 61 and 62 will be broken.

When lever 46 is raised as described the lug 47 will move away from the needle valve 39 so that spring 41 will thus be permitted to lift said valve from its seat 37 and establish communication between the passages 42 and 43.

Pressure of water entering the passage 18 against the washer 22 and piston 21 will be sufficient to depress diaphragm 24 so that communication will thus be established between passage 18 and the inner or upper portion of the annular bore 20 whereby the water or other liquid can thus flow freely from pipe 16 to pipe 17.

Should the contents of the tube 4 contract due to the chilling of the condensing medium, the pressure under the diaphragm 11 would be correspondingly reduced so that springs 75 would thrust the disk 14 against the diaphragm and lower it as shown for example in Figure 2. As lever 46 would thus be relieved of the support by pin 15, spring 71 can then promptly depress lever 46 whereby it will pull on the point of connection with the intermediate lever 52 and shift it to the position shown in Figure 2 thereby bringing the mercury switch to a point where it will establish an electrical contact. This movement will also bring the stud 47 against the needle or relief valve 39 so as to force it against its seat, overcoming the action of spring 41.

As soon as the valve 39 engages its seat a pressure will begin to build up in the chamber or annular recess 25 due to the leakage of fluid through the tubular bolt 27. This accumulating pressure will be sufficient to hold the diaphragm 24 in its uppermost position, thereby pressing the washer 22 tightly against its seat and effectively cutting off communication between the inlet pipe 16 and the outlet pipe 17. The spring 28 acts to overcome any equalization of pressures at the two sides of the diaphragm that might otherwise be present.

It will be noted that when there is a fall of pressure under the diaphragm 11 the entire load of the springs 75 acts to depress the diaphragm and the entire load of spring 71 acts to move lever 46 to close the relief or needle valve 39. This valve cannot open until the load on disk 14 is overcome and lever 46 is raised against spring 71. With the arrangement illustrated practically all of the spring load is carried by the disk 14 and not by the lever mechanism.

When there is a rise of pressure under the diaphragm 11, the levers will be actuated as heretofore explained, it being understood that nut 51 will permit lever 46 to rise high enough to meet all normal operating requirements. However, should there be a water failure as frequently occurs in the operation of refrigerating apparatus, the pressure would continue to rise in the tube 4 until it becomes so high as to force the diaphragm 11 and disk 14 upwardly to operate the parts as heretofore explained, permit lifting of the relief valve 39 and breaking the electrical circuit. The circuit will be broken whether or not the valve becomes frozen or obstructed.

While the structure is designed primarily for use with mechanical refrigerating systems, it can also be used in heating plants and wherever an automatic control is desired.

Instead of using the tube 4 with its pipe connection, the pressure inlet port 6 can be connected to the ammonia line of a refrigerating apparatus as set forth, for example, in my co-pending application filed August 2, 1928, Serial Number 297057, on which this present invention is an improvement.

By removing the lower member 23 of the structure, free access is afforded to all the internal parts of the valve without removing any of the line connections after the valve has been installed and is ready for operation.

What is claimed is:

1. A device of the class described including opposed chambers, a diaphragm separating the same, inlet and outlet ports in communication with one of the chambers, means carried by the diaphragm for closing communication between the ports, a tubular member extending through the diaphragm and said closing means to permit leakage of fluid from one chamber to the other, a by-pass connecting the chambers, a yieldingly supported relief valve therein normally open, a pressure operated diaphragm, a lever, yielding means for retarding the movement of the lever in one direction, means for transmitting movement from the last-named diaphragm to the lever, and means for transmitting motion from the lever to the relief valve during the actuation of said lever by its yieldable retarding means.

2. A device of the class described including opposed chambers, a diaphragm separating the same, inlet and outlet ports in communication with one of the chambers, means carried by the diaphragm for closing communication between the ports, a tubular member extending through the diaphragm and said closing means to permit leakage of fluid from one chamber to the other, a by-pass connecting the chambers, a yieldingly supported relief valve therein normally open, a pressure operated diaphragm, a member mounted thereon, springs for exerting a pressure against said member, a lever, means for transmitting motion in one direction from the pressure actuated diaphragm to the lever and against the action of said spring, said diaphragm, when relieved of pressure, being adapted to shift to normal position under the action of the springs, adjustable means for transmitting motion from the lever to the relief valve when relieved from the action of the pressure actuated diaphragm, and a spring for actuating said lever to shift the valve to closed position.

3. A device of the class described including opposed chambers, a diaphragm separating the same, inlet and outlet ports in communication with one of the chambers, means carried by the diaphragm for closing communication between the ports, means in the diaphragm adapted to permit leakage of fluid from one chamber to the other, a by-pass connecting the chambers, a yieldingly supported relief valve therein normally open, a pressure operated diaphragm, a lever, yielding means for retarding the movement of the lever in one direction, means for transmitting movement from the last-named diaphragm to the lever, and means for transmitting motion from the lever to the relief valve during the actuation of said lever by its yieldable retarding means.

4. A device of the class described including opposed chambers, a diaphragm separating the same, inlet and outlet ports in communication with one of the chambers, means carried by the diaphragm for closing communication between the ports, a tubular member extending through the diaphragm and said closing means to permit leakage of fluid from one chamber to the other, a by-pass connecting the chambers, a yieldingly supported relief valve therein normally open, a pressure operated diaphragm, a spring for holding the same normally in one position when not subjected to predetermined pressure, a lever, means for transmitting motion to the lever from the diaphragm when subjected to a predetermined pressure, means for actuating the lever in one direction when relieved from the action of the diaphragm, and adjustable means carried by the lever and separate from the relief valve for actuating said relief valve when the lever is actuated under the action of its spring.

5. A device of the class described including opposed chambers, a diaphragm separating the same, inlet and outlet ports in communication with one of the chambers, means carried by the diaphragm for closing communication between the ports, means for permitting leakage of fluid from one chamber to the other, a by-pass connecting the chambers, a relief valve therein normally open, a pressure operated diaphragm, a member mounted thereon, means for exerting a pressure against said member, a lever, means for transmitting motion in one direction from the pressure actuated diaphragm to the lever and against the action of said pressure means, said diaphragm, when relieved of pressure, being adapted to shift to normal position under the action of the pressure means, adjustable means for trnsmitting motion from the lever to the relief valve when relieved from the action of the pressure actuated diaphragm, and means for actuating said lever to shift the valve to closed position.

In testimony that I claim the foregoing as my own, I have hereto affixed my signature.

MICHAEL HENRY ACKERMAN.